(No Model.) 4 Sheets—Sheet 1.
C. E. BUELL.
SYSTEM OF ELECTRIC LIGHTING FOR RAILWAY TRAINS.
No. 270,735. Patented Jan. 16, 1883.
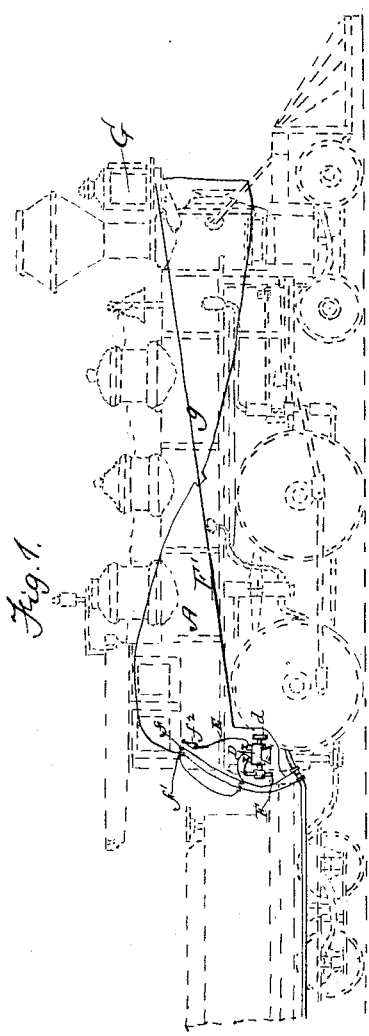
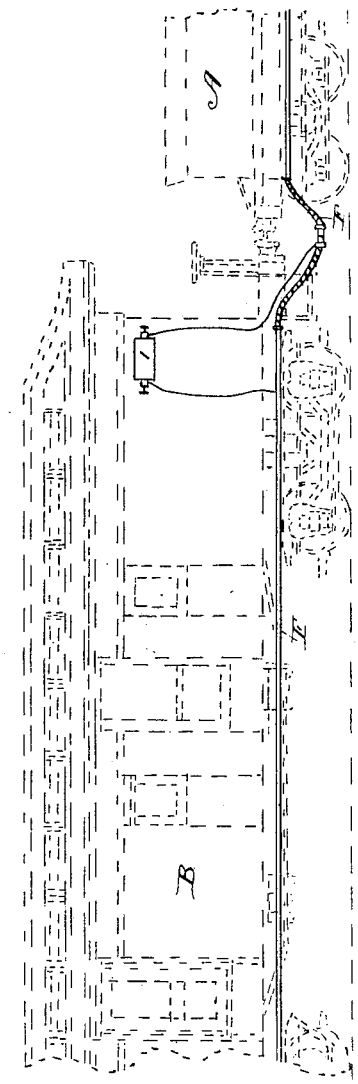
WITNESSES:
F. H. Knight
Fred F. Church
INVENTOR
Charles E. Buell
By Melville Church
His Attorney (No Model.) 4 Sheets—Sheet 2.
C. E. BUELL.
SYSTEM OF ELECTRIC LIGHTING FOR RAILWAY TRAINS.
No. 270,735. Patented Jan. 16, 1883.
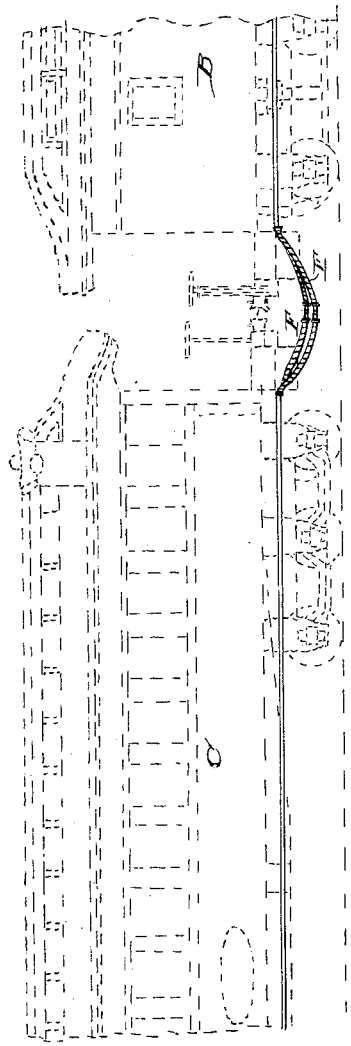
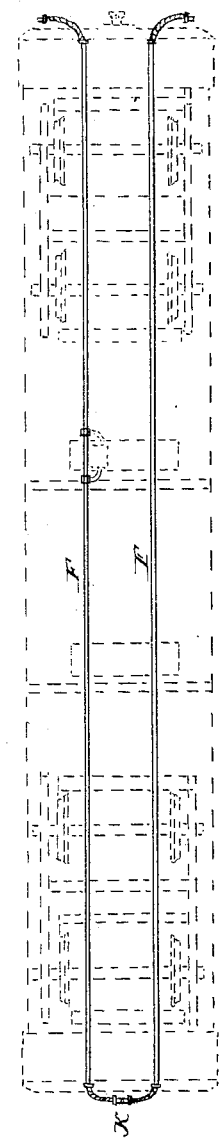
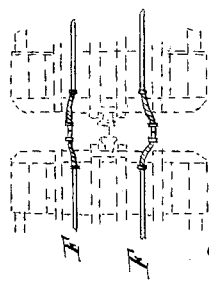
WITNESSES:
F. H. Knight
Fred F. Church
INVENTOR
Charles E. Buell
by Melville Church
His Attorney (No Model.)  4 Sheets—Sheet 3.
C. E. BUELL.
SYSTEM OF ELECTRIC LIGHTING FOR RAILWAY TRAINS.
No. 270,735. Patented Jan. 16, 1883.
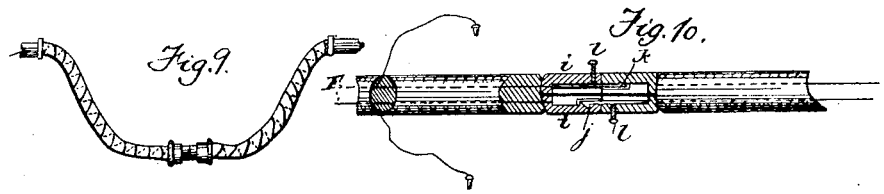
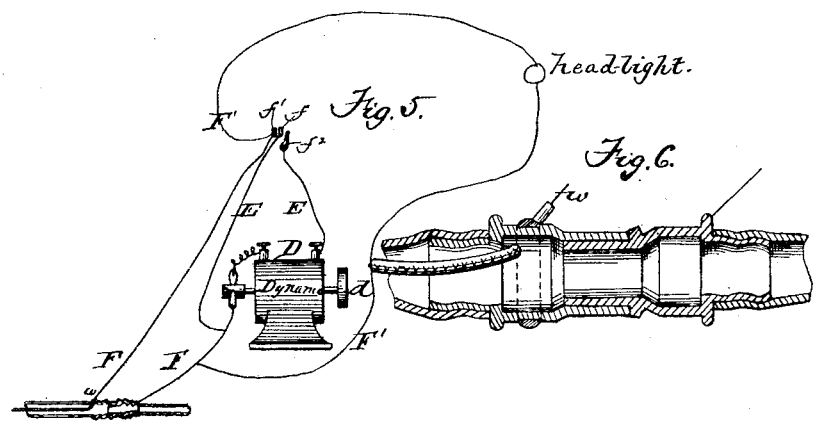
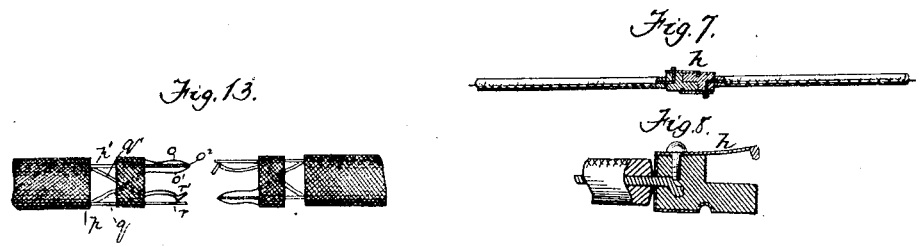
WITNESSES:
F. K. Knight
Fred F. Church
INVENTOR
Charles E. Buell
by Melville Church
His Attorney.

(No Model.) 4 Sheets—Sheet 4.
C. E. BUELL.
SYSTEM OF ELECTRIC LIGHTING FOR RAILWAY TRAINS.
No. 270,735. Patented Jan. 16, 1883.
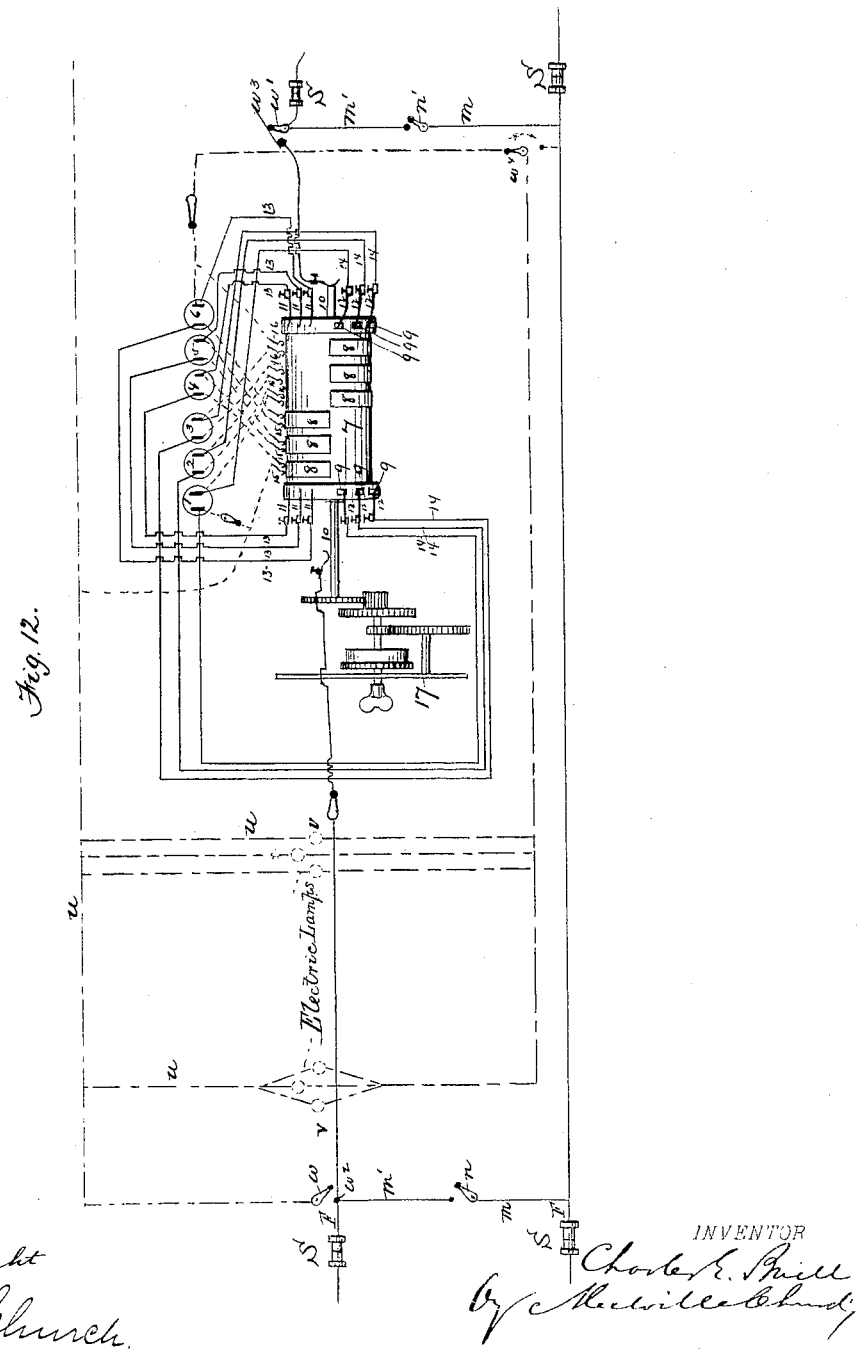
WITNESSES:
J. H. Knight
Fred P. Church
INVENTOR
Charles E. Buell
by Melville Church
His Attorney

UNITED STATES PATENT OFFICE.

CHARLES E. BUELL, OF NEW HAVEN, CONNECTICUT.

SYSTEM OF ELECTRIC LIGHTING FOR RAILWAY-TRAINS.

SPECIFICATION forming part of Letters Patent No. 270,735, dated January 16, 1883.

Application filed June 13, 1882. (No model.)

*To all whom it may concern:*

Be it known that I, CHARLES E. BUELL, of New Haven, in the county of New Haven and State of Connecticut, have invented a certain new and Improved System of Electric Lighting for Railway-Trains; and I do hereby declare the following to be a full, clear, and exact description of the same, reference being had to the accompanying drawings, forming part of this specification, and to the letters of reference marked thereon.

My invention relates to an improved system of electric lighting for railway-trains, comprehending the generation of the electricity in an economical manner by the motion of the train or otherwise, the conveying of the current from car to car, provision of suitable connection to permit of the separation of the cars and the uncoupling and disconnection of the electrical conductors between the same, the provision of suitable electric lamps and circuits in the cars, and the storing of the electricity in each car, so that each car can be lighted whether coupled or not with other cars, the whole system being calculated to effect the lighting of the train in a more efficient, safe, and economical manner than heretofore.

My invention consists in certain novel combinations of elements, which will be hereinafter described, and pointed out specifically in the claims.

In the accompanying drawings, Figure 1 is a view of a locomotive-engine carrying and driving the dynamo-electric generator which furnishes the electrical power in my improved system of railway-lighting. Figs. 2 and 3 are views showing the electrical connection between the engine and cars. Fig. 4 is a bottom plan view of a car, showing the conductors thereto connected, composing part of the main charging-circuit. Fig. 5 is a view of the dynamo-electric generator, its several circuits, and the switching devices by which the engineer is enabled to control the same. Figs. 6, 7, 8, 9, 10, 11, and 13 show various forms of conductors for the charging circuit and couplings for the same between the cars. Fig. 12 is a diagram showing the equipment of each car of the train.

Similar letters of reference in the several figures denote the same parts.

A represents a locomotive-engine, B a mail-car, and C a passenger-car, composing a railway-train.

D is a dynamo-electric generator, mounted upon the engine, preferably beneath the engineer's seat, and having a friction-pulley, $d$, secured to its armature-shaft, and adapted to bear against the periphery, side, or inner portion of one of the driving-wheels of the engine, as shown in Fig. 1, so as to impart direct motion to the armature from said driving-wheel with the least amount of gearing and within the most compact space. The dynamo is adapted to be worked upon an open circuit, or to be included in a developing-circuit, E, or to be included in a charging-circuit and split into a main circuit, F, extending through the train and into a branch circuit, F', leading to and including electric lighting appliances at the front of the engine.

Suitable contacts, $f f'$, and a switch, $f^2$, are arranged within the cab to enable the engineer to control these circuits. When the switch is turned off both contacts, as shown in Figs. 1 and 5, the dynamo is permitted to run on an open circuit; but by turning the switch to contact $f$ it is interposed in the developing-circuit. Then, by moving the switch so that it will rest on both contacts $f$ and $f'$, the current will be divided between the developing and charging circuits; and then, upon moving the switch still farther, so that it will rest upon contact $f$ alone, the developing circuit will be broken and the whole current directed into the charging-circuit. This arrangement of circuits and switching devices is necessary in order to prevent back-flow of current over the charging-circuit from the storage-batteries interposed therein, as hereinafter explained, from affecting the field-of-force magnets of the dynamo.

The branch charging-circuit F may lead to head-light G through an insulated wire, $g$, and return upon the metal parts of the engine, as shown; or it may both lead to and return from the head-light over insulated wires, if desired.

I preferably conceal a series of storage-batteries in the head-light, and adapt them to be interposed in the branch charging-circuit in any well-known manner, to be charged and to discharge in a working-circuit including an electric lamp, as will be readily understood.

The main charging-circuit F extends to the end of the train and back again to the dynamo over any suitable conductors, provision being made for the connection and disconnection of the conductors between the cars in order that when the cars separate the conductors may also separate. In extending the main charging-circuit through the train, I find it convenient to make use of the pipes of the air or vacuum brake system, as shown in the drawings. Where only one metal pipe is employed in such brake system, as shown in Figs. 1 and 2, I make such pipe serve as one branch of the circuit, and employ for the other branch of the circuit a return insulated wire, $w$, arranged preferably within said pipe, as shown in Fig. 6. Where, on the other hand, two pipes are employed, as shown in Figs. 3, 4, and 11, one pipe may be utilized as the outgoing branch of the circuit and the other as the return-branch. In either system, as there are flexible sections of rubber or other non-conducting material at the ends of the pipes of each car, provision has to be made for bridging the gaps formed by these sections, and a very convenient way of accomplishing the object is to connect one end of an insulated wire to the end of the metallic pipe, and then wind it spirally about or through the flexible section, and connect it to the metal coupling at the extremity, as shown in Fig. 9. When the couplings are brought together the circuit is completed. Where, however, a single pipe is employed with return-wire within the pipe, such wire may be led out through the side of the metal coupling, as shown in Fig. 6, and provided with an electric coupling—such as shown in Fig. 7, at $h$—so as to connect it to a similar electric coupling on the conductor leading from the pipe on the next car.

Instead of employing the pipes of a brake system, the outgoing and return branches of the charging-circuit may consist of separate insulated conductors united by couplings between the cars, as shown in Fig. 7; or both conductors may be inclosed in a single insulating-covering, as shown in Fig. 10, in which case a two-part coupling is employed on the end of the conductors of each car—such, for instance, as shown in Fig. 10, where $i\ i$ represent two metal parts suitably insulated from each other, one part having a shoulder, $j$, formed in it and connected to one branch of the circuit, and the other carrying a metal catch-spring, $k$, adapted to be operated by a button, $l$, and connected to the other branch of the circuit. This coupling is adapted to engage with a similar coupling on the conductors of the adjoining car, as will be readily understood by inspection of Fig. 10.

All of the electric couplings between the cars are preferably constructed so that they will automatically uncouple when the cars are separated.

As the uncoupling of any car ordinarily breaks the charging-circuit, it is necessary to provide means for connecting the conductors at each end of the car, so that the circuit may be completed whenever necessary. Where two brake-tubes are employed, as hereinbefore described, such connection can be effected by coupling the two tubes together, as shown in Fig. 4, at K, or by providing branch conductors $m\ m'$ and a switch, $n'$, as shown in Fig. 12; but where both the outgoing and incoming branches of the circuit are within the same insulated covering, as in Figs. 10 and 13, a novel form of automatic coupling may be employed—such as shown in Fig. 13—that will not only automatically connect and disconnect with its counterpart on the adjoining car to continue each branch of the circuit, but will, when disconnected, automatically bring together both branches of the circuit, so as to complete the same. Referring to said Fig. 13, $o\ o'$ represent two metal pieces, separated by an insulator, $o^2$, the inner metal piece, $o'$, being electrically connected to the conductor $p$ of the circuit by a wire or strip, $q$, while the outer metal piece, $o$, is connected to the conductor $p'$ of the circuit. $r$ is a rigid metal piece, connected to the conductor $p$, and $r'$ is a spring connected to the conductor $p'$, as shown, by wire or strip $q'$. When two couplings constructed in this manner are brought together, so that the parts $o\ o'$ of one will slide in between the parts $r\ r'$ of the other, electrical connection between the parts of each branch of the circuit will be established; but when the couplings are separated the parts $r\ r'$ of each will come together, and thus connect both branches of the circuit together. In this way the circuit between all the cars that remain attached to the engine is kept closed in working order, and is not left open if any of the cars become detached.

In Letters Patent of the United States granted to me June 13, 1882, No. 259,362, I have shown, described, and claimed certain improved combinations of elements in a system of electric lighting for railway-trains, each of said combinations comprising as elements thereof, among others, a main electric charging-circuit, an independent lamp-circuit, two series of secondary batteries, and switch devices adapted to place one series of said secondary batteries in the charging-circuit, coupled for quantity, to be charged and to simultaneously place the other series of secondary batteries in the lamp-circuit to be discharged, coupled for intensity; but the switching mechanism and connections shown and described in said patent are such that the batteries of one series, when arranged for discharging, are not only coupled so as to discharge together in tension series, but also so as to discharge among themselves, thereby causing more or less diminution of discharge into the lamp-circuit. This discharge of the batteries among themselves results from the fact that the batteries of each series are adapted to be charged through sub-branches of a common main branch of the charging-circuit, besides having connections which adapt them to be coupled together for intensity, and the switching mechanism, when operated, to cause the discharge of either series, cuts off the appropriate main branch of the charging-circuit from the charging-circuit proper, and couples the batteries of that series together in a lamp-circuit in tension series; but the connections to the sub-branches of the said main branch remaining unbroken, sub-circuits are formed, which cause said batteries to discharge among themselves.

In my present invention, which is an improvement upon the one before patented to me, each battery of a series is adapted to be charged through an independent main branch of the charging-circuit instead of through a sub-branch of a main branch common to all the batteries of a series, and the consequence is that when the batteries of each series are discharging, with their appropriate independent charging-branches disconnected from the charging-circuit proper, the batteries do not discharge among themselves, but only into the lamp-circuit coupled for intensity.

In Fig. 12 I show in diagram a complete electric lighting equipment arranged in accordance with my present invention—such as I employ upon each car of a train—consisting of the conductors F F, forming part of the main charging-circuit and carrying the couplings S S at their ends, the branch wires $m$ $m'$ and switches $n$ $n'$, for joining the branches of the charging-circuit at either end of the car; two series of storage-batteries 1 2 3 and 4 5 6, a working or lamp circuit, $u$, (shown in dotted lines,) including electric lamps $v$ $v$, a switching-cylinder, 7, having two series of metallic projections, 8 8 8; two other series of metallic projections, 9 9 9, electrically connected to the shaft 10, which is in turn adapted to be included in the charging-circuit; two series of pairs of spring-contacts, 11 11 11 and 12 12 12, adapted to make contact with the series of projections 9 9 9; a series of conductors, 13 13 13, each including one of the series of secondary batteries 4, 5, and 6; and when the pairs of contacts 11 11 11 are in connection with the pairs of projections 9 9 9, constituting independent branches of the charging-circuit; another series of conductors, 14 14 14, each including one of the series of secondary batteries 1 2 3, and, when the pairs of contacts 12 12 12 are in connection with the projections 9 9 9, constituting other independent charging-branches of the main charging-circuit; a series of pairs of spring-contacts, 15 15 15, having proper connections (indicated by dotted lines) with the series of batteries 4 5 6, and with the lamp-circuit $u$, and adapted, when in connection with one series of metallic projections 8 8 8, to interpose said series of batteries 4 5 6 in the lamp-circuit, coupled for intensity; another series of pairs of spring-contacts, 16 16 16, having similar connections with series of secondary batteries 1 2 3, and with the lamp-circuit, and adapted, when connected to the other series of metallic projections 8 8 8, to interpose said series of batteries 1 2 3 into the lamp-circuit coupled for intensity; and a clock mechanism, or its equivalent, 17, for imparting motion to the switching-cylinder, so as to effect the charging of one series of batteries through the independent branches of the main charging-circuit and the discharge of the other series of batteries, with their independent charging-branches disconnected from the main charging-circuits wholly into the lamp circuit coupled for intensity, as before described. Said diagram also shows switches $w$ and $w'$, which, when closed to their contacts $w^2$ $w^3$, connect the lamps directly into the main charging-circuit. This provision renders it practicable to run the lights either on the circuit supplied by the storage-batteries or on the main charging-circuit supplied directly from the dynamo. Switches $w$ $w^4$ may also be employed, if desired, to interpose the lamp-circuit directly into the main charging-circuit.

The storage-batteries and switching apparatus on each car may be arranged in the closets thereof, or between the floors, or in a receptacle beneath the car, or elsewhere out of the way; but wherever placed provision should be made to prevent them from freezing—as, for instance, by surrounding them with sawdust or other non-conducting material, running steam-pipes in proximity to them, or by other well-known modes of protection. The disposition of the several electric circuits in each car can be varied to suit the constructor.

While I have shown the dynamo as mounted upon and driven by the locomotive-engine, and regard such an arrangement as probably the most practicable, it is obvious that it might be located elsewhere on the train, and be driven from any transporting-wheels thereof.

The manner of insulation of the various conductors employed in the system I have not dwelt upon, it being necessary only to state that all such conductors are sufficiently well insulated to serve the purpose for which they are intended.

Having thus described my invention, I claim as new—

1. In a system of electric lighting for railway-trains, the combination of the following elements, namely: an electrical generating machine mounted on the engine and propelled thereby, a main charging-circuit extending from the engine through the train, with circuit-connecting devices between the engine and the several cars, means for placing the generator in the charging-circuit, a normally-independent lamp-circuit in each car, two series of secondary batteries, the pairs of which are separately connected to independent branches of the charging-circuit, and switching devices in each car for alternately connecting the independent charging-branches of one series to the charging-circuit, so as to charge the pairs of that series in quantity, and at the same time disconnecting the charging-branches of the pairs of the other series from the main charging-circuit, and interposing said other series into the lamp-circuit coupled for intensity.

2. In a system of electric lighting for railway-trains, the combination of the following elements in the equipment of each car, viz: electrical conductors forming part of a main charging-circuit, with means for connecting and disconnecting said conductors to and from those of adjoining cars, two series of secondary batteries, the pairs of which are separately connected to independent branches of the main charging-circuit, an independent lamp-circuit and switching devices for alternately connecting the independent charging-branches of one series to the charging-circuit, so as to charge the pairs of that series in quantity, and at the same time disconnecting the charging-branches of the pairs of the other series from the main charging-circuit, and interposing said other series into the lamp-circuit coupled for intensity.

3. In a system of electric lighting for railway-trains, the combination of the following elements in the equipment of each car, viz: electrical conductors forming part of a main charging-circuit, with means for connecting and disconnecting said conductors to and from those of adjoining cars, two series of secondary batteries, the pairs of which are separately connected to independent branches of the main charging-circuit, an independent lamp-circuit, and switching devices for alternately connecting the independent charging-branches of one series to the charging-circuit, so as to charge the pairs of that series in quantity, and at the same time disconnecting the charging-branches of the pairs of the other series from the main charging-circuit, and interposing said other series into the lamp-circuit coupled for intensity, and other switch devices for including at will one discharging series of secondary batteries or the main charging-circuit in the independent lamp-circuit, substantially as described.

CHARLES E. BUELL.

Witnesses:
F. H. KNIGHT,
FRED F. CHURCH.